July 19, 1966 M. CONTRE 3,261,057
APPARATUS FOR PRODUCING VERY HIGH STATIC PRESSURES
WITHIN A HEXAHEDRAL SOLID
Filed Nov. 24, 1964 2 Sheets-Sheet 1

United States Patent Office 3,261,057
Patented July 19, 1966

3,261,057
APPARATUS FOR PRODUCING VERY HIGH STATIC PRESSURES WITHIN A HEXAHEDRAL SOLID
Michel Contre, Massy, France, assignor to Commissariat à l'Energie Atomique, Paris, France
Filed Nov. 24, 1964, Ser. No. 413,558
Claims priority, application France, Dec. 6, 1963, 956,306
2 Claims. (Cl. 18—16)

The present invention relates to an apparatus which is intended to permit the production of very high static pressures within a solid which has the simple geometric shape of a hexahedron, whether an isosceles hexahedron or regular hexahedron.

It is known that the production of very high pressures has been studied in particular by Messrs. P. W. Bridgemann and H. T. Hall and a large number of researches in this field have led to the design of devices which make use of a series of anvils or supporting members having a high degree of hardness which are each carried by the rod of a jack, the combined assembly of jacks thus constituted being designed to produce simultaneous action on the solid to be compressed which usually has a cubic or tetrahedral shape. Devices of this type have an essential advantage in that they produce a system of substantially hydrostatic forces within the compressed solid. However, when presented in the form of a cube or tetrahedron, such a solid does not have a plane of symmetry which contains three arrises or a ternary axis of symmetry. Now it is known that, in the case of certain researches which make use, for example, of X-rays or infra-red rays under pressure, it is not possible under such conditions to make a complete examination of a sample which is enclosed within the compressed solid, especially on account of the dead angles which are necessarily created by the geometrical arrangement of the anvils which compress the solid and the mechanical devices employed for the operation of these latter.

The object of this invention is therefore to provide a device whereby a system of forces can be produced and directed towards a solid which has the shape of a hexahedron with triangular faces and which therefore has precisely a completely free and nuobstructed plane of symmetry as well as a ternary axis of symmetry, in such manner as to permit the possibility of carrying out optical studies or radiation studies under the most favorable conditions.

To this end, the apparatus in accordance with the invention is characterized in that it comprises six rams each fitted at its extremity with a part forming an anvil which exerts normal and simultaneous compressive stresses on each face of the solid, said rams being grouped together in two sets of three rams and arranged symmetrically at an angle of 120° relatively to each other within two annular members which are coupled together by means of vertical columns, said vertical columns being also arranged symmetrically between said rams at an angle of 120° relatively to each other.

According to a first form of embodiment of the invention, each ram is integral with the rod of a hydraulic jack mounted on the annular members which are maintained in a stationary position, said jack being coupled to a control system in such a manner as to exert identical and simultaneous stresses on the faces of the hexahedron. In accordance with another design, the rams are mounted in such manner as to slide in groups of three in the conical face of a cavity of revolution which is formed respectively in each of the two annular members, said annular members being moved towards each other by means of at least one hydraulic jack.

By virtue of these arrangements and irrespective of the form of embodiment which is adopted, it can be seen that each face of the solid which has the shape of a hexahedron is thus subjected to a normal compressive stress, the six stresses which are exerted on the six faces being such as to converge approximately towards the center of the solid. It should be noted in this connection that two alternative forms can be contemplated in each case, depending on whether it is desired to produce the convergence of said stresses at the geometric center of the hexahedron or whether it is sought to obtain at the time of initial compression of the solid a thickness of joint which is substantially equal at every point along each of the arrises of the hexahedron. In fact, it will be apparent that, at the commencement of the operation which consists in applying the anvils against the solid, there takes place a slight creepage or plastic flow of the material of said solid, thereby resulting in the escape of this material and forming a joint along the arrises connecting the faces on which the compressive stresses are applied.

Simple geometric considerations show that, in the case of the first alternative form, each of the faces of the hexahedron has the shape of a right-angled isosceles triangle. In the second case, the triangles referred to above are only isosceles triangles with angles so determined that all of the straight lines formed between two faces of the hexahedron which intersect along an arris are equal. This last-mentioned solution, according to the technological advantages which it procures, is also the solution which has been more particularly envisaged in two examples of application which will now be given hereinafter by way of indication and not in any limiting sense.

In the accompanying drawings.

Figure 1:
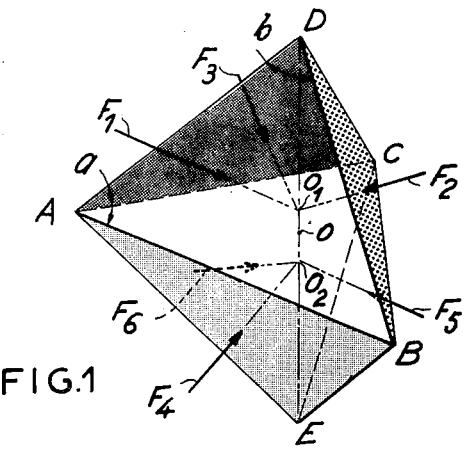
FIG. 1 is a view in perspective of a solid having the shape of a hexahedron which is intended to be subjected to a system of convergent forces within an apparatus which is constructed according to the invention.

As can be seen from FIG. 1, the solid to be compressed has the shape of a hexahedron ABCDE which is formed from the geometrical point of view by the juxtaposition of two equal tetrahedrons ABCD and ABCE which are made of any suitable material such as talc, pyrophyllite, silver chloride and the like. The triangle having a base ABC is equilateral whilst the faces such as ADB, for example, have the shape of an isosceles triangle.

In accordance with a preferred arrangement, the base angles such as $a$ of the isosceles triangles ADB, BDC, etc. are equal to 41.4 degrees, the angle at the apex such as $b$ of these triangles being equal to 97.2 degrees. In this manner, the straight line of the dihedron $A\hat{B}D$, $A\hat{B}E$, for example, is equal to the straight line of the dihedron $A\hat{B}D$, $D\hat{B}C$, for example, the common value being 98.2 degrees. Under these conditions, stresses which are exerted at the center of each face of the hexahedron in the direction of the arrows $F_1$, $F_2$, $F_3$ etc. converge respectively at two points $O_1(F_1, F_2, F_3)$ and $O_2(F_3, F_4, F_5)$ which are separate and symmetrical with respect to the base plane ABC while being located on the axis of symmetry DE.

Figure 2:
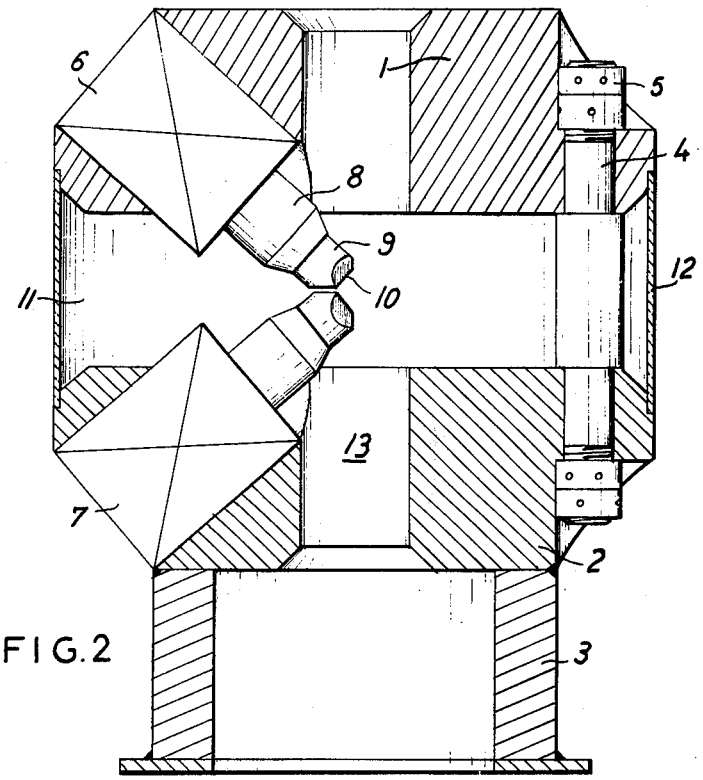
FIG. 2 is a diagrammatic view of another form of embodiment of the specifically exemplified apparatus, this view being taken in vertical cross-section.

FIG. 2 illustrates schematically a first form of embodiment of an apparatus which precisely serves to exert the stresses $F_1$, $F_2$, etc. on the hexahedron which is shown in FIG. 1. Accordingly, the apparatus is composed of two massive annular members 1 and 2 which are supported on a frame 3 and rigidly maintained parallel to each other by means of three vertical columns such as the column 4 which are locked by means of two fixing nuts 5 and disposed symmetrically at an angle of 120° with respect to each other about the axis of the apparatus.

In accordance with the invention, there are mounted in each of the annular members jacks such as the jacks 6 and 7, the jacks 6 of the top angular member 1 and the jacks 7 of the bottom annular member 2 being respectively three in number and symmetrically spaced at an angle of 120° with respect to each other between the vertical columns 4. The thrust-rod 8 of each jack is integral with a ram 9, the frontal face 10 of which is plane and so shaped that it can be brought to bear against one of the faces ABD, BCD etc. of the hexahedron so as to exert on this latter the desired stresses $F_1$, $F_2$, $F_3$, etc.

It will be observed that the foregoing arrangement thus makes it possible to leave between the stationary annular members 1 and 2 an intermediate space 11 which provides full clearance in the plane of symmetry ABC of the hexahedron. It is therefore easy to visualize the advantages which are attached to the foregoing arrangement, particularly in regard to the possibility of placing in position a complete testing and measuring equipment unit for the purpose of carrying out X-ray diffraction studies, an equipment unit of this kind being usually constituted by a circular goniometric rack which can thus easily be placed within the space 11 around the rams 9 and between the assembly columns 4. There can also be provided around the apparatus an annular closure plate 12 of any suitable material, especially for the purpose of avoiding any contamination of the surrounding atmosphere in the event of experimentation on radioactive samples. Finally, it becomes possible, by virtue of the arrangement of the jacks, to give full clearance for a vertical passageway 13 between the rings 1 and 2, thereby permitting the possibility of carrying out optical or other studies along the axis DE of the hexahedron.

The frontal faces 10 of the rams 9 which constitute the anvils proper can be formed in any suitable manner which is already known. Preferably, said faces will be made of tungsten carbide and constituted by a carbide core which is maintained against the ram by means of a banding member, this arrangement permitting of easy replacement of cores which have sustained damage during handling operations. Other arrangements can also be contemplated such as, in particular, a circulation of cooling water within each ram as well as a connection for the supply of a high-intensity current to each anvil with provision for a suitable electric insulation.

Each jack is fitted with a device for rapid advance and withdrawal whereby action can be produced either simultaneously or separately on either one or the other of the two assemblies carried by the annular members 1 and 2. Moreover, the simultaneous convergence of the six rams can be carried out with a high degree of precision by virtue of a follow-up control system designed to operate during the stage of compression proper of the hexahedral solid, since in point of fact, this stage corresponds to only a small range of motion of the jacks. Finally, a number of different safety devices can be employed for the purpose of ensuring a rapid oil-pressure drop simultaneously in all of the jacks so as to prevent any failure which might otherwise result from the hydraulic equipment or from the sudden fracture of an anvil.

Figure 3:
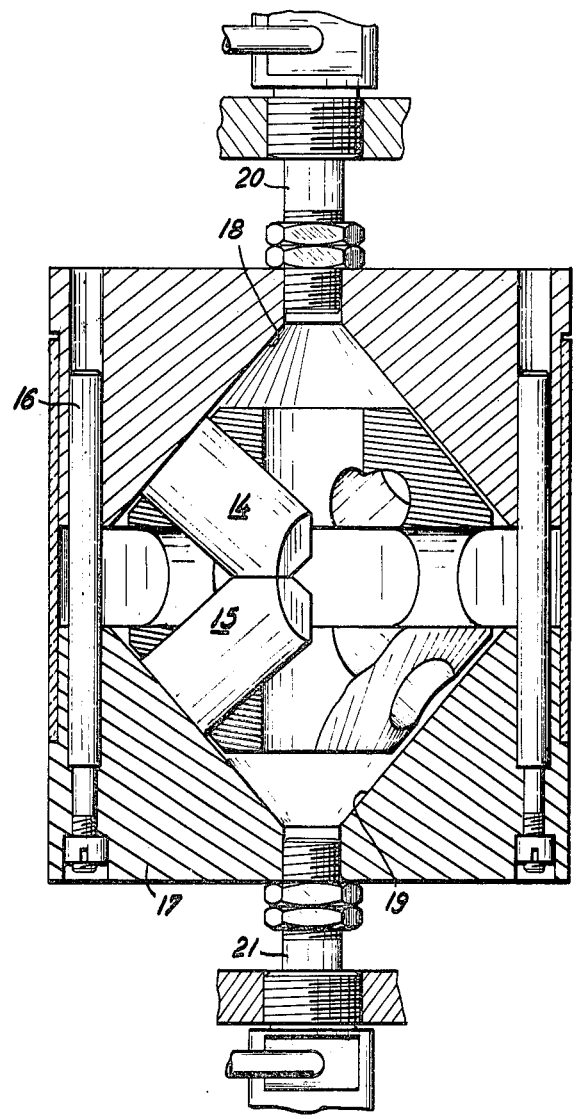
FIG. 3 is a view in vertical cross-section of another form of embodiment.

FIG. 3 illustrates another form of embodiment wherein the rams such as those designated by the references 14 and 15 are again arranged in groups of three inside the two parallel annular members 16 and 17. However, in this example, the rams are capable of sliding in groups of three in the conical faces 18 and 19 of two cavities formed axially in the two annular members, whilst said annular members can be moved either closer together or away from each other by means of the two hydraulic jacks 20 and 21 with which they are respectively integral. The rams are thus caused to converge towards the hexahedron and the compression of this latter is carried out in precisely the same manner as has been explained in connection with the first form of embodiment.

As will be readily apparent, this invention is not limited to the forms of embodiment which have been described and illustrated, and which have been given solely by way of example.

What I claim is:

1. Apparatus for producing very high static pressures within a hexahedral solid having triangular faces, said apparatus comprising six rams each fitted at its extremity with a part forming an anvil which exerts normal and simultaneous compressive stresses on each face of the solid, said rams being grouped together in two sets of three rams and arranged symmetrically at an angle of 120° relatively to each other within two angular members which are coupled together by means of two vertical columns, said vertical columns being also arranged symmetrically between said rams at an angle of 120° relatively to each other, each of the faces of the hexahedral solid having the shape of a right-angled isosceles triangle.

2. Apparatus for producing very high static pressures within a hexahedral solid having triangular faces, said apparatus comprising six rams each fitted at its extremity with a part forming an anvil which exerts normal and simultaneously compressive stresses on each face of the solid, said rams being grouped together in two sets of three rams and arranged symmetrically at an angle of 120° relatively to each other within two annular members which are coupled together by means of two vertical columns, said vertical columns being also arranged symmetrically between said rams at an angle of 120° relatively to each other, each of the faces of the hexahedral solid having the shape of an isosceles triangle, the angles of which are so determined that the straight lines of the dihedron formed by two faces which intersect along an arris are all equal.

References Cited by the Examiner

UNITED STATES PATENTS

| | | |
|---|---|---|
| 3,088,168 | 5/1963 | Lloyd et al. |
| 3,100,912 | 8/1963 | Lloyd et al. |
| 3,134,139 | 5/1964 | Wentorf. |

WILLIAM J. STEPHENSON, *Primary Examiner.*